United States Patent Office 3,489,705
Patented Jan. 13, 1970

3,489,705
STRIPPABLE WAX POLYMER COATING
Robert P. Zmitrovis, Freehold, and Eugene W. Sanders, Highstown, N.J., assignors to Cities Service Oil Company, Tulsa, Okla., a corporation of Delaware
No Drawing. Filed Jan. 30, 1967, Ser. No. 612,352
Int. Cl. C09d 5/20
U.S. Cl. 260—28.5                                                 7 Claims

ABSTRACT OF THE DISCLOSURE

A composition having a petroleum wax base, preferably paraffin wax, a paraffin wax, microcrystalline wax blend, or microcrystalline wax, a copolymer binding and strengthening constituent such as ethylene vinyl acetate or ethylene ethyl acrylate copolymers in an amount of up to 50% by weight of the composition and an organic amide release agent preferably N-coco gamma hydroxybutyramide in the amount of at least 0.1% by weight. Other organic amides suitable as a release agent are synthetic wax amides (M.P. 140° F. to 290° F.) and fatty acid amides.

BACKGROUND OF THE INVENTION

This invention relates to a strippable wax-polymer coating composition comprising a petroleum wax base, a wax compatible copolymer and a release agent.

Cheap, effective, easily applied and readily removable coatings have always been required particularly for shipping and storage of items which tend to deteriorate or corrode during such handling. Various coatings have been used in the past such as application of a grease, or use of wax coatings but with attendant disadvantages and ineffectiveness. Among these are the lack of abrasion resistance and the removal problem of the various greases. The use of waxes also has posed similar problems as by their inability to maintain a coating over sharp corners, brittleness, relative lack of resistance to abrasion, and tedious, time consuming removal.

In order to overcome the aforesaid problems and provide an improved coating, various compositions for use as coatings have been developed. Various compositions attempt to eliminate some of the disadvantages of wax by mixing a polymer with the wax to obtain a homogeneous composition thereby overcoming many of the inherent disadvantages of the wax alone. Such compositions are described in U.S. Patent No. 2,559,645 issued July 10, 1951 to Larsen et al. Among the disadvantages of such a compound are that while the coatings can be removed in large pieces, yet they are not readily strippable and adhere to the coated article so that they must forcibly be removed. To provide for simple removal of these wax-polymer coatings, the article had to be initially coated with a release agent such as a mineral oil or a silicone oil, thereby necessitating a two step operation.

SUMMARY OF THE INVENTION

The composition of this invention is a readily strippable coating homogeneous composition comprising a petroleum wax base, a copolymer constituent in sufficient amount to provide flexibility and good film and cohesive strength to the composition, and an organic amide release agent, to cause the composition to be stripped easily from a coated article.

It is therefore an object of this invention to provide a readily applied and strippable coating composition, thereby obviating the necessity of separate coatings.

It is another object to provide a coating composition which is easily applied, resistant to abrasion, cracking and puncture, and readily removable by stripping.

It is a further object of this invention to provide an easily strippable coating composition which is impermeable to corrosive agents, and possessing anticorrosive properties.

Other objects and advantages will be apparent from the following description of the compositions of this invention.

DESCRIPTION OF THE PREFERRED EMBODIMENTS

The petroleum wax base component of the composition may be any one or a combination of various paraffin and microcrystalline waxes obtained from petroleum. Ordinarily these paraffin waxes are solid crystalline hydrocarbon mixtures wholly derived from that portion of crude petroleum commonly designated paraffin distillate; or from hydrocarbon synthesis by low temperature solidification and expression or by solvent extraction. They are distinguished by their solid state at room temperature even under high pressure, and by low viscosity at above 200° F. when melted. The preferred petroleum waxes are those paraffin waxes having less than 2% oil and characterized by a melting point of from about 120° F. to about 165° F. with a viscosity of from about 35 to about 60 SUS at 210° F., microcrystalline waxes obtained from petroleum residuum fractions and purified by solvent extraction and characterized by a melting point from about 140° F. to about 210° F. with a viscosity of from about 60 to about 120 SUS at 210° F. and blends of such paraffin and microcrystalline waxes in any desired amount. The petroleum wax base of the strippable coating composition is in the amount of at least 50% of the total weight of the coating composition.

The polymeric constituent of the coating composition may be any of various known copolymers which form a homogeneous mixture with the petroleum wax base and impart good binding and strength qualities to the mixture. Copolymers which have been found to be preferred in the composition of this invention are those which readily dissolve in petroleum wax. Examples of such copolymers are ethylene vinyl acetate copolymers, ethylene-ethyl acrylate copolymers, and ethylene isobutyl acrylate copolymers, characterized by molecular weight of from 1500 to 500,000 and a melt index range (according to ASTM D 1238) of from about 0.5 to about 500. Other suitable polymers are the polyalkenes, the polymeric esters of methacrylic acid, and the various alkyl vinyl acetates, alkyl vinyl butyrates and alkyl vinyl propionates where the alkyl group has from 1 to 5 carbon atoms. Such polymers should have molecular weights of from 1,500 to 500,000. The polymer component of the strippable component can be used in the amount of from about 1% to about 50% of the total weight of the coating composition although the preferred amount by weight of the polymer is from about 20% to about 50% of the composition.

Another constituent of the coating composition of this invention is a release agent which imparts various qualities to the coating, at least one of which would case the coating to separate or part from the surface of the coated article without any difficulty, and leave behind a clean surface with no coating particles remaining. A further quality of the release agent may be as a corrosion inhibitor. Various organic amides have been found to be suitable release agents imparting the aforesaid qualities to the wax-polymer coating composition. Such suitable organic amides are acid amides having from 14 to 22 carbon atoms, synthetic wax amides, n-alkyl gamma alkoxy butyramides and n-alkyl gamma hydroxybutyramides.

The aforesaid hydrocarbon amide release agents are included in the amount of at least 0.1% by weight of the composition. Examples of suitable fatty acid amides are palmitamide, stearamide and behenamide. However, unsaturated acid amides such as erucamide and oleamide are preferred over the saturated fatty acid amides as release agents in the composition according to our invention.

The synthetic wax amides, generally known as Carlisle waxes found suitable as the release agent constituent of the composition according to our invention are characterized by a melting point of from 140° F. to 290° F. Examples of such synthetic wax amides suitable for incorporation in the coating composition of this invention are Carlisle 240 wax and Carlisle 280 wax. Carlisle 240 wax is a hard, high melting synthetic wax prepared from oleamide characterized by having a melting point range of 235–245° F., an acid value of 10 max. a flash point of 515° F. and a tan color. Carlisle 280 wax is a hard, light colored, high melting wax comprising N, N'-ethylenebis-stearamide, characterized by having a melting point range of 280–290° F., an acid value of 10 max. and a flash point of 530° F.

Examples of suitable N-alkyl gamma hydroxybutyramides are N-butyl gamma hydroxybutyramide and N-coco gamma hydroxybutyramide. The N-alkyl gamma hydroxybutyramide may be prepared from a gamma butyrolactone by reaction with an alkyl amine as shown;

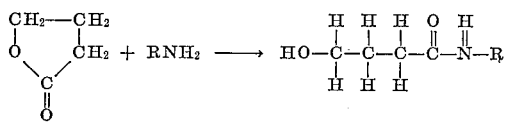

where R is an alkyl group having from 8 to 18 carbon atoms.

Other suitable variations and modifications of the butyramide are described by the following structural formula:

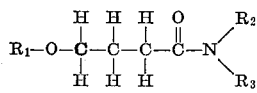

where $R_1$, $R_2$ and $R_3$ can be hydrogen or an alkyl group having from 1 to 25 carbon atoms. Examples of such suitable N-alkyl gamma alkoxybutyramides are N-coco gamma ethoxybutyramide, N-amyl gamma methoxybutyramide, and N-di-propyl gamma butoxybutyramide.

The preferred release agent constituent is N-coco gamma hydroxybutyramide where the coco group has from 8 to 18 carbon atoms, the said release agent being in the amount of from about 0.25% to about 2% by weight of the coating composition. The N-alkyl gamma hydroxybutyramides not only impart good release qualities to the coating but act as corrosion inhibitors, thereby imparting a two fold added advantage to the coating composition, that of being readily strippable and of providing anticorrosion protection if necessary to the coated article.

Various methods may be used to prepare the homogeneous coating compositions of the invention. For instance the wax component may be melted at a suitable temperature, The polymer is then added to the melted wax with constant and vigorous stirring in the amount of from 1% to 50% of the coating composition by weight although amounts no less than 5% by weight are preferred. Either simultaneously or subsequently with the addition of polymer, the organic amide constituent is added, also while the mixture is subjected to vigorous high shear stirring. However, homogeneous blend preparation is best effected by adding the desired amount of copolymer to the melted wax with stirring at about a temperature of 250° F. to 300° F. In order to prevent the loss of possibly volatile release agents, they are added last and the temperature may be lowered during this step of the preparation.

Additionally, various other additives may be added to obtain any desired qualities of flexibility, hardness, tack and slip. Such additives may include polyethylene, polypropylene, polyisobutylene, butyl rubber, rosin and rosin esters, terpene resins, hydrocarbon resins, substituted styrene copolymer resins, coumarone-indene resins and asphaltic materials.

In coating an article with the composition, the article should be substantially clean, though if desired an anticorrosive compound such as mineral oil or other anticorrosion agents maye be wiped on the article. The article is then dipped into the melted coating composition the temperature of which is in the range of 175° F. to 300° F. and held for several seconds, 3 to 15 seconds being preferable. The article which is newly coated is then removed from the melted composition. The coating is found to be suitably thick and uniform so as to completely coat the article effectively even at sharp corners. Furthermore, the coatings are readily removable by stripping, once a starting incision is made.

Application of the coating composition can also be effected by spraying the article with the composition in a molten state. This would be preferable for large and difficult to handle objects. Application may also be achieved by applying the composition of this invention in a powdered form to the object, and then dry heating the coated object to fuse the composition into an effective coating.

In order to more fully illustrate the composition according to this invention and as a comparison with other compositions the following examples are given. It is to be understood that there is no intention of being limited to any specific limitation as disclosed herein.

Example 1

Machined bolts were freshly cleaned and dipped into a molten coating composition as shown in Table 1 for 3 seconds at a dip temperature of 200° F. The various compositions consisted of about 67% 100 Neutral paraffin wax (a 125° F. M.P. completely refined wax with all aromatic material removed), and 32% Elvax 260 (a Du Pont ethylene-vinyl acetate copolymer having a melt index of 5 to 7 and a vinylacetate content of 27 to 29% by weight), with from 0.25 to 1% N-coco gamma hydroxybutyramide. The coatings were evaluated after aging for one week at room temperature (75° F.). A "good release" coating was one that would part from the surface of the article without any difficulty, leaving behind a clean surface with no coating particles remaining. An unsatisfactory release was indicated by either no release or by difficult release with large areas of coating remaining on the bolts. Although a residual film and corrosion inhibitor was found to be present after removal of the strippable coating, it can if desired be removed by wiping or by use of some mineral spirit solvent. The results obtained for the various compositions are as given in Table 1.

TABLE 1

| Components Wt. Percent | Compositions | | | |
| --- | --- | --- | --- | --- |
| | A | B | C | D |
| 100 Neutral wax | 67 | 67.5 | 67.75 | 68 |
| Elvax 260 | 32 | 32 | 32 | 32 |
| N-coco gamma hydroxybutyramide | 1 | .5 | .25 | |
| Release properties | (¹) | (¹) | (¹) | (²) |

¹ Good.
² Unsatisfactory.

Salt water corrosion tests revealed that corrosion is more dependent on a break in the coating rather than the coating itself. Also, those articles not having the release agent showed slight corrosion. As indicated above, the coating composition without the release agent was firmly bonded to the metal and did not release at all.

Example 2

Freshly cleaned 2 x 3 inch steel panels were dipped into the molten compositions listed in Table 2 for 15 seconds at dip temperatures of 300 to 350° F. Results show the Synthetic Amide Wax (240 M.P.) to be a good release agent, as compared to composition without a release agent.

TABLE 2

| Components | Compositions | |
|---|---|---|
| | E | F |
| 350 Neutral wax | 48 | 60 |
| Elvax 260 | 50 | 40 |
| Synthetic amide wax (240 MP) | 2 | |
| Release properties | Good | Unsatisfactory |

The coating compositions of Tables 1 and 2 of paraffin wax and polymers but without the inclusion of the release agents of this invention showed no release of the coating.

Accordingly, with the intention of covering all changes and modifications as may be within the scope of this invention, and not intending to be limited to the forms disclosed herein, as these are to be regarded as illustrative rather than restrictive.

We claim:

1. A readily removable homogeneous composition for protectively coating articles, which composition comprises:
   (a) a petroleum wax as a base material;
   (b) a polymer in sufficient concentration to provide good film strength, cohesive strength, and flexibility to the composition; and
   (c) a butyramide soluble in hot petroleum wax in the amount of from 0.1% by weight to about 10% by weight of the composition, said butyramide being selected from the group consisting of N-alkyl gamma alkoxybutyramides and N-alkyl gamma hydroxybutyramides.

2. The composition of claim 1 wherein the N-alkyl gamma alkoxybutyramide is characterized by the formula:

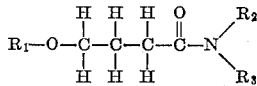

wherein $R_1$, $R_2$ and $R_3$ are either a hydrogen atom or an alkyl group having from 1 to 25 carbon atoms.

3. The composition of claim 1 wherein the N-alkyl gamma hydroxybutyramide is N-coco gamma hydroxybutyramide, and is characterized by the formula:

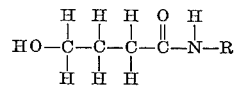

where R is an alkyl having from 8 to 18 carbon atoms.

4. The composition of claim 3 wherein the N-coco gamma hydroxybutyramide is in the amount of from about 0.25% to about 2% by weight of the composition.

5. The composition of claim 4 wherein the polymer is in the amount of from 5% to about 50% by weight of the composition, and is selected from the group consisting of polyalkene polymers, polymeric esters of methacrylic acid, alkyl vinyl acetates, alkyl vinyl butyrates and alkyl vinyl propionates where the alkyl has from 1 to 5 carbon atoms and the polymer has a molecular weight of from 1,500 to 500,000.

6. The composition of claim 5 wherein the polymer is an ethylene vinyl acetate copolymer having a molecular weight of from 1,500 to about 500,000 and is in the amount of from about 20% to about 50% of the composition by weight.

7. The composition of claim 6 wherein the petroleum wax is a blend of paraffin and microcrystalline waxes.

References Cited

UNITED STATES PATENTS 2,898,301   8/1959   Mayhew _____ 252—51.5
3,306,882   2/1967   Pullen et al. _____ 260—28.5

MORRIS LIEBMAN, Primary Examiner

S. L. FOX, Assistant Examiner

U.S. Cl. X.R.

117—6; 252—392; 260—32.6